Aug. 21, 1962 M. CAMRAS 3,049,790

MAGNETIC HEAD AND METHOD OF MAKING SAME

Filed June 3, 1954 3 Sheets-Sheet 1

Inventor
Marvin Camras
by Hill, Sherman, Meroni, Gross & Simpson Attys

Aug. 21, 1962 M. CAMRAS 3,049,790

MAGNETIC HEAD AND METHOD OF MAKING SAME

Filed June 3, 1954

3 Sheets-Sheet 2

Inventor
Marvin Camras
by Hill, Sherman, Meroni, Gross & Simpson Attys

Aug. 21, 1962 M. CAMRAS 3,049,790

MAGNETIC HEAD AND METHOD OF MAKING SAME

Filed June 3, 1954 3 Sheets-Sheet 3

Inventor
Marvin Camras
by Hill, Sherman, Meroni, Gross & Simpson Attys

United States Patent Office 3,049,790
Patented Aug. 21, 1962

3,049,790
MAGNETIC HEAD AND METHOD OF MAKING SAME

Marvin Camras, Chicago, Ill., assignor to Armour Research Foundation of Illinois Institute of Technology, Chicago, Ill., a corporation of Illinois Filed June 3, 1954, Ser. No. 434,281
15 Claims. (Cl. 29—155.5)

This invention relates to a magnetic head such as used in magnetic recording, reproducing and erasing, and to a method of making such a head.

It is an object of the present invention to provide a novel method for making a magnetic head.

It is a further object of the present invention to provide a method of making a magnetic head wherein the gap is disposed in a very precise straight line.

It is a still further object of the present invention to provide a method for making a magnetic head wherein the gap space is very small and accurate.

It is another object of the present invention to provide a method for making a magnetic head wherein the sensitive core material is completely annealed, and no mechanical operations are necessary on the head after annealing.

It is still another object of the present invention to provide a method of making a magnetic head whereby the critical part of the head is held very securely and permanently.

It is yet another object of the present invention to provide a magnetic head which can withstand high temperatures.

A further object of the present invention is to provide a head wherein all record member contacting surfaces are metal and to provide a novel method for making such a head.

It is another and further object of the present invention to provide a multiple head having gaps in a very precise straight line disposition, and to provide a novel method for forming such a head.

Other objects, features and advantages of the present invention will be more fully apparent from the following detailed description taken in conjunction with the accompanying sheets of drawings, in which.

Figures 2, 3, 4, 4A, 4B, 5, 6:
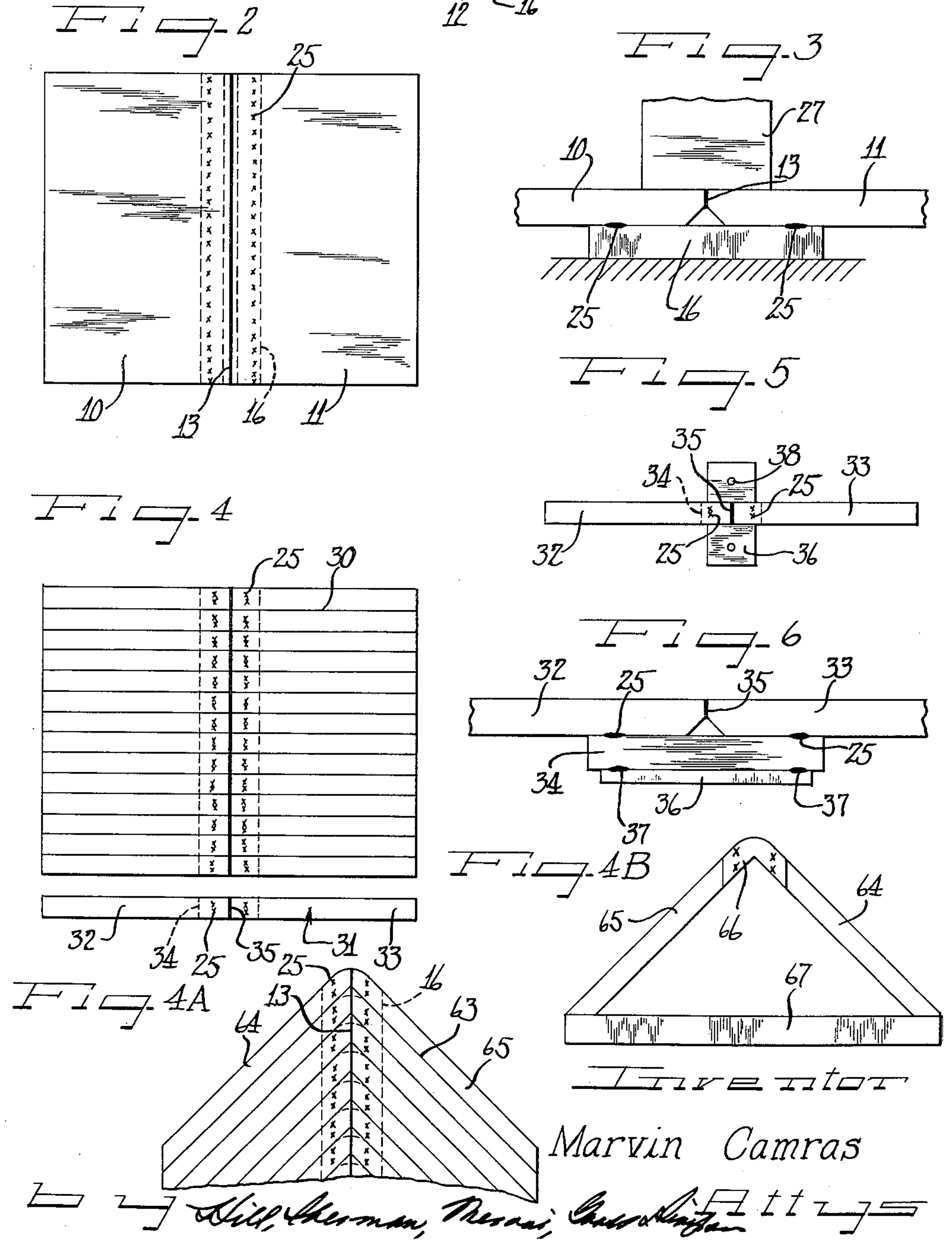
FIGURE 2 is a top plan view of the sheets of FIGURE 1 and indicating diagrammatically the spot welds between the sheets and the non-magnetic member.
FIGURE 3 is a fragmentary diagrammatic side elevational view of the structure of FIG. 1 illustrating an optional step in the method wherein high pressure may be applied to the confronting edges of the sheets to further close the gap therebetween.
FIGURE 4 is a diagrammatic plan view similar to FIG. 2, but illustrating the step of severing the sheets transversely into a plurality of pole subassemblies.
FIGURE 4A is a diagrammatic plan view similar to FIGURE 4, but illustrating an alternative manner of severing the sheets.
FIGURE 4B is a side elevational view of a magnetic head formed by the method of FIGURE 4A.
FIGURE 5 illustrates a top plan view of a pole subassembly secured to a metal mounting bracket in accordance with an optional step of the method.
FIGURE 6 is a fragmentary enlarged diagrammatic side elevational view of the structure of FIG. 5.
Figure 11:
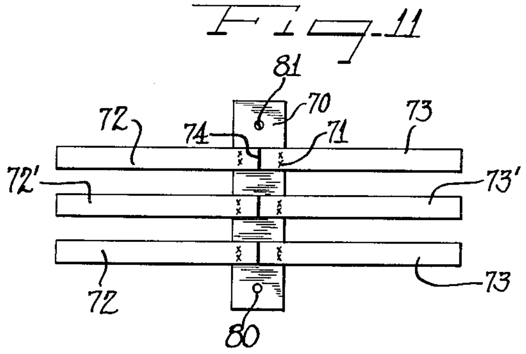
FIGURE 11 illustrates a step in a modified method according to the present invention whereby a pair of sheets are spot welded to a non-magnetic member to accommodate removal of spaced portions of the sheets in the construction of a multiple gap head.
Figure 13:
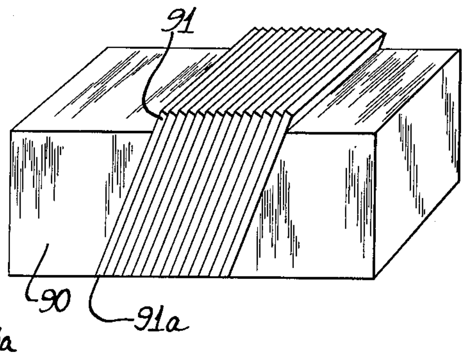
FIGURE 13 illustrates a step in a further method according to the present invention, whereby a plurality of magnetic sheets are simultaneously formed with a beveled edge.
Figure 14:
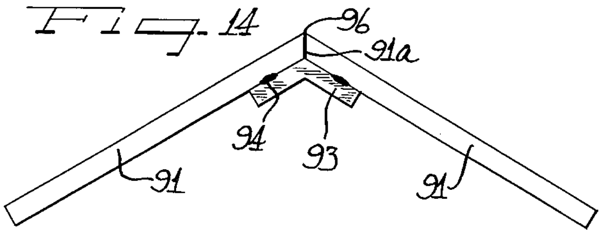
Figure 15:
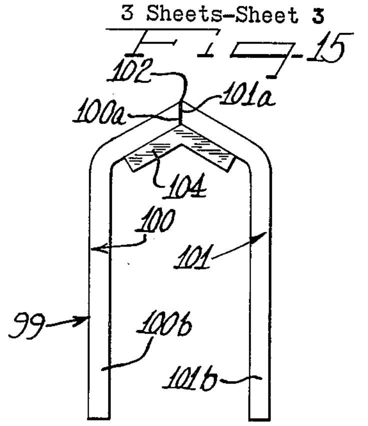
Figure 16:
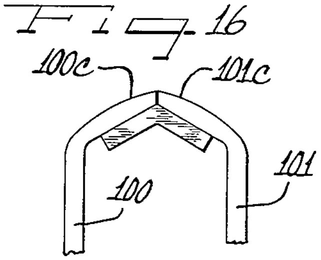
Figure 17:
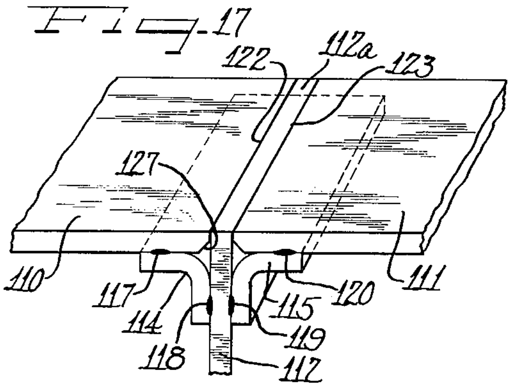
Figure 19:
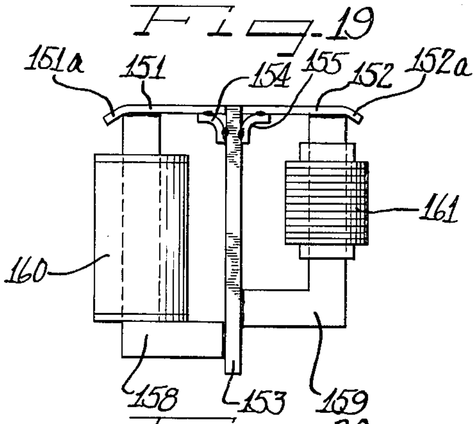
Figure 18:
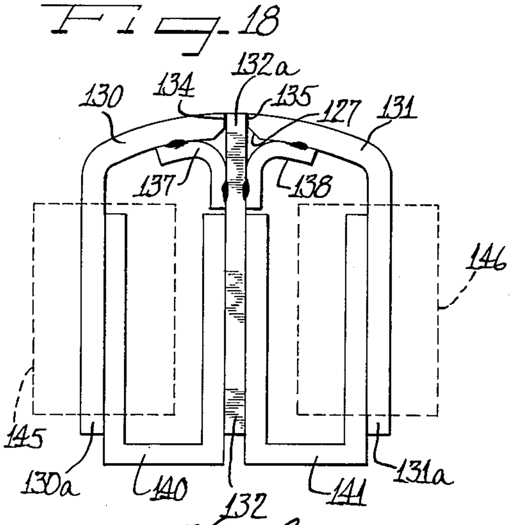
Figure 20:
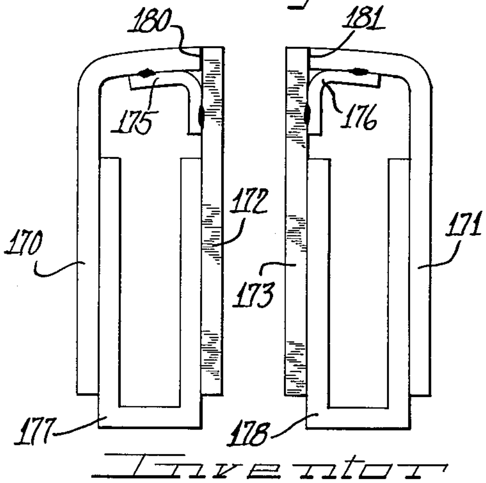

FIGURE 14 indicates a further step where the beveled edges formed by the step of FIG. 13 are secured in confronting relation to a generally V-shaped non-magnetic member;

FIGURE 15 indicates the step of bending the extremities of the sheets after severing as in FIG. 4, or FIG. 11;

FIGURE 16 illustrates the manner in which the confronting pole portions of FIGURE 15 may be rounded to provide a smooth tape-receiving surface;

FIGURE 17 illustrates a still further modified form of the method of the present invention wherein a pair of sheets of magnetic material have edges disposed on opposite sides of the end of a third sheet to provide a pair of closely spaced gaps, separate subassemblies being thereafter formed by the methods of FIG. 4 or FIGURE 11;

FIGURE 18 illustrates a combined erase-record-playback structure constructed by the method of FIG. 17;

FIGURE 19 illustrates a modified head assembly which may be formed from the structure of FIGURE 17; and FIGURE 20 illustrates a method similar to that of FIGURE 17 whereby the respective gaps are formed with the end portions of separate sheets, which gaps may be used in separate heads or combined into a multiple gap head assembly having a greater spacing between the gaps than the head assembly of FIGURE 18.

As shown on the drawings:

In the embodiment of the present invention illustrated in FIGS. 1 through 10, a pair of rectangular sheets 10 and 11 have elongated edges thereof polished straight and of suitable configuration to define the pole tips of a magntic head for use in magnetic recording, reproduction or erasing. For example, the edges of the sheets may be tapered as indicated at 12 in FIG. 1. The edges of the sheets are disposed in confronting relation with a non-magnetic material indicated at 13 interposed between the confronting edges. The gap spacer 13 may be made of beryllium copper, copper, platinum, or other metallic material or material having a relatively high melting point in relation to the annealing temperature for the magnetic material of the sheets 10 and 11. The gap 13 may have a typical thickness of 0.0001 to 0.00025 inch, and the gap material may comprise an electroplated or evaporated film deposited on the confronting end edges of the sheets for convenience in handling.

The sheets 10 and 11 are tightly clamped in confronting relation upon a non-magnetic member 16, clamping means being indicated diagrammatically at 17 and 18 for exerting a positive pressure on the outer ends of the sheets. The clamping means 17, 18 thus represent a jig for holding the confronting edges of the sheets in precise gap-defining relation. While the edges of the sheets are thus pressed toward each other, the sheets are secured to the non-magnetic member 16 which may be made of "Everdur," "Inconel," non-magnetic stainless steel, or other material capable of providing a rigid surface for defining the positions of the confronting edges of the sheets. The member 16 should preferably be of a high resistivity material to minimize eddy current loss.

"Everdur" is a copper-silicon alloy while "Inconel" is a nickel-chromium-iron alloy. Non-magnetic manganese steel alloys are also suitable for the member 16.

Figure 1:
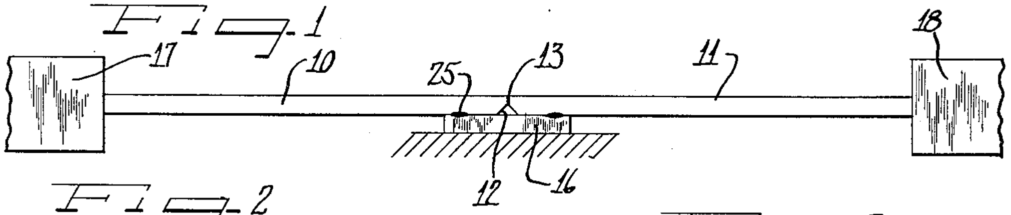
FIGURE 1 is a somewhat diagrammatic side elevational view illustrating a pair of sheets of magnetic material secured to a non-magnetic member in accordance with a step in the method of the present invention.

The manner of securing the sheets to the non-magnetic member should provide a bond capable of withstanding the annealing temperature for the sheets, and perferably the sheets are secured to the non-magnetic member by means of a series of spot welds as indicated diagrammatically at 25 in FIGS. 1 and 2. A series of spot welds are preferred to a continuous weld line because they give lower electrical eddy current loss in the finished head. The spot welds 25 may be closer to the gap 13 if desired, however, if the welds are too close to the gap the welding operation is apt to distort the precision of the gap line.

Figure 8:
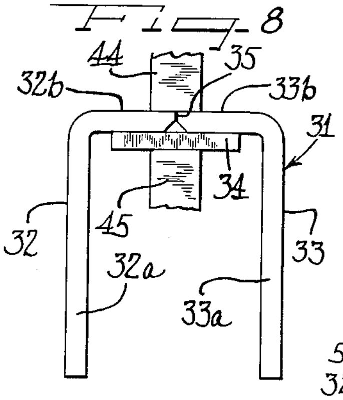
FIGURE 8 illustrates a pole subassembly with legs bent to receive energizing windings, and indicates the step of clamping the pole strips to the non-magnetic member at the gap portions thereof during the bending operation.

The weld pits may then be cleaned off, and if necessary, a high pressure may be applied at the gap portion by means of a tool indicated at 27 in FIGURE 3 to further close the gap 13 due to a peening or mushrooming action of the confronting edges of the sheets. This peening step may be applied after bending the side legs as shown in FIGURE 8 if necessary.

FIGURE 4 illustrates the step of cutting the sheets 10, 11 and the non-magnetic member 16 transversely of the gap 13 along severance lines such as 30 to divide the sheets into subassemblies such as indicated at 31 in FIG. 4, each comprising magnetic pole strips 32 and 33 secured to a non-magnetic support member 34 and having a non-magnetic gap 35.

As indicated in FIG. 5 and 6, a mounting bracket 36 may be secured to the non-magnetic member 34, as by means of spot welding as indicated at 37, and have apertures 38 for receiving mounting screws in suspending the head assembly in a metallic housing or the like.

Figure 7:
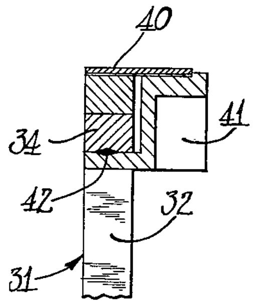
FIGURE 7 is a fragmentary diagrammatic sectional view illustrating a metal tape guide bracket secured to the pole subassembly in accordance with a further optional step of the method, and illustrating a tape record member in section cooperating with the guide.

As illustrated in FIG. 7, for a head subassembly 31 which is to be utilized with a multi-channel tape, indicated in section at 40, a tape support and guide bracket 41 may be secured to the non-magnetic member 34 as by means of spot welding, a weld being indicated at 42.

It will be observed from FIG. 4, that the spot welds 25 are so disposed on the sheets that the severance lines 30 extend between adjacent welds. Each pair of strips 32 and 33 will then be properly secured to the cooperating non-magnetic member 34.

As illustrated in FIG. 8, the outer extremities 32*a* and 33*a* of the head subassembly 31 may be bent into parallel relation while clamping solidly at the gap portion of the strips as by means of clamps diagrammatically indicated at 44 and 45. At this stage in the fabrication of the head, the subassembly 31 may be polished at the tape contacting faces 32*b*, 33*b*, and all final bending, machining, grinding and other mechanical operations on the subassembly completed. In this manner, the sensitive core material may be completely annealed with no detraction from the beneficial effects of the annealing as a result of subsequent mechanical operations, as has heretofore been necessary in the manufacture of commercial heads.

The head subassembly of FIG. 8 is then hydrogen annealed at a high temperature, for example 1900° F. if a copper spacer is employed, or at a higher annealing temperature if a higher melting point gap spacer is used. For especially critical work the cores can be held in a jig during annealing to prevent even slight warping and to insure a precision fit in the final assembly without stressing the cores.

After annealing, the pole piece structure 31 is complete; however the structure can be given a light polish on the pole faces 32*b* and 33*b* after annealing, although this will be done automatically by the tape used on the head.

The pole piece structure 31 is preferably assembled in nested relation with a pair of U-shaped yokes 50 and 51 having exciting windings 52 and 53 thereon.

Figure 9:
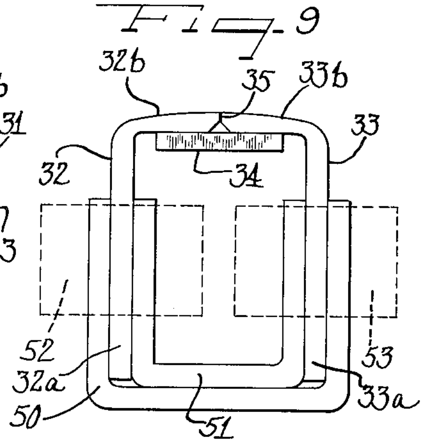
FIGURE 9 illustrates a head utilizing the pole subassembly of FIGURE 8.
Figure 10:
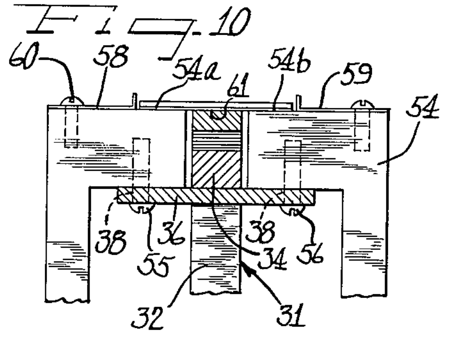
FIGURE 10 illustrates a manner of monuting a head having the mounting bracket illustrated in FIG. 5 with a metallic housing.

FIGURE 10 illustrates the manner in which a head assembly such as shown in FIG. 9 but with the support bracket shown in FIGS. 5 and 6, may be mounted in a shielded housing 54 by means of mounting screws 55 and 56 passing through the apertures 38 in the mounting bracket 36. The shielded housing may have tape guide members 58 and 59 adjustably secured thereto by means of slots therein receiving clamping screws 60, with one channel of a tape indicated diagrammatically at 61 traveling over the confronting poles of the head subassembly 31, while adjacent channels of the tape cooperate with surfaces may be of magnetic material to act as magnetic keepers. It will be appreciated that a head assembly of this construction can withstand high temperatures and provides tape contacting surfaces which are all of metal.

FIGURE 4A and 5B illustrate a modified method in accordance with the present invention wherein the sheets 10 and 11 of FIGURE 2 are cut along curved severance lines such as 63 to provide curved pole pieces such as 64 and 65 secured to an arcuate non-magnetic strip 66, FIGURE 4B. The magnetic circuit of the resultant head may be completed in any suitable manner, as by a base strip 67 lapping the lower ends of the polepiece strips. In the head of FIGURE 4B, the flat pole strips 65 and 66 lie in a common plane parallel to the plane of the non-magnetic strip 66.

Figures 12, 12A:
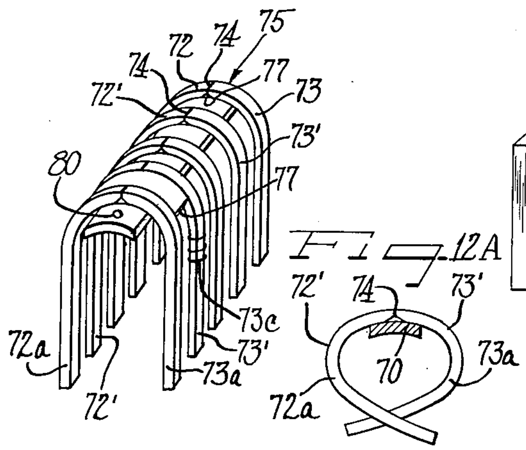
FIGURE 12 illustrates the multiple head construction of FIGURE 11 with the ends of the strips of magnetic material bent to provide the legs for receiving energizing coils.
FIGURE 12A is a transverse sectional view of the head of FIGURE 12 and illustrates an optional construction for magnetic compensation of cross talk between active gaps of a multiple head.

FIGS. 11 and 12 illustrate a modified method wherein a multiple head construction is formed. A pair of sheets with confronting edges are secured to a non-magnetic member 70 in a manner similar to that shown in FIG. 2, except that the spot welds such as indicated at 71 are preferably formed in spaced groups so that when the sheets are cut into separate strips in a manner similar to that shown in FIG. 4, every other strip of the sheet can be removed from the non-magnetic support member 70 to provide the structure shown in FIG. 11 with successive pairs of strips 72, 73 secured to a continuous non-magnetic member 70 and defining gaps 74. In other words, in this modified method, the sheets only are severed into strips, with the depth of cut adjusted so as not to cut through the support member 70. Instead of removing a strip portion between adjacent pole pairs by making two spaced parallel cuts in the sheets, the structure of FIGURE 11 may be formed by milling spaced slots in the sheets at a depth to remove the magnetic material of the sheets without disturbing the non-magnetic support member 70. The milled cuts may be quite narrow where closely spaced heads are required.

The multiple gap assembly 75 shown in FIG. 12 is formed from the structure of FIG. 11 by bending the outer extremities 72*a*, 73*a* into parallel relation for receiving windings as in the embodiment of FIG. 9, the coil for each of the legs 72*a*, for example, ordinarily being connected in a separate electric circuit. Spacer strips of non-magnetic metal such as that indicated at 77 in FIGURE 12 are preferably spot welded to the non-magnetic member 70 between each adjacent pair of gaps 74 of the multiple head construction for supporting a multichannel tape having channels traveling over the respective gaps 74, and for isolating adjacent gaps. The non-magnetic spacer strips such as 77 may be applied before bending the legs 73a and 72a of the assembly or alternatively, the spacer strips may be a part of a housing in which the multiple head assembly is mounted.

Instead of using each pair of poles 72, 73 for recording or playback, alternate pairs such as 72', 73' act as magnetic keepers. These unused pole units may be made narrower than the ones which are used. The unused pole legs 72a, 73a may be bent out of the way, cut-off, or wound with compensating coils such as indicated at 73c to prevent cross talk. Alternatively the pole legs of the pairs 72', 73' may be crossed over as indicated in FIGURE 12A for magnetic compensation of cross talk. It will be understood that the compensating windings such as 73c would be connected to the energizing coils of the active poles in such a manner as to oppose leakage flux between adjacent pairs of active poles during recording, and to induce a voltage in series with the active coils opposing a voltage induced in the active coils by any leakage flux from channels associated with adjacent active pairs of poles.

The head may then be subjected to the desired mechanical operations as in the previous embodiment. If desired holes indicated at 80 and 81 may be drilled in the opposite ends of the non-magnetic member 70 for supporting the multiple head construction in a metal shielding housing in a manner similar to that indicated in FIG. 10.

After all mechanical operations, the multiple head subassembly shown in FIG. 12 is annealed as in the previous embodiment and assembled with coils in a housing in a manner such as indicated in FIGS. 9 and 10 of the previous embodiment, as by means of screws extending through the apertures 80, 81 and secured to the metal housing to suspend the multiple gap head construction from the housing.

It will be understood that a multiple head formed by the above method will have a very precise straight line of gaps, and that the head assembly will not be subject to plastic flow and temperature effects such as are encountered in plastic embedded type heads.

In FIGS. 13 to 16, a further embodiment of the present invention is illustrated wherein a fixture 90 is employed to bevel an elongated edge of each of a plurality of sheets 91, which may be made of permalloy, by means of angle surface lapping, a beveled edge being indicated at 91a.

A pair of such sheets 91 are secured to a generally V-shaped non-magnetic member 93, as by spot welds indicated diagrammatically at 94 with the beveled edges 91a in spaced confronting relation and separated by gap material 96 which may be provided in any one of the manners, previously described. The gap may be pressed together during welding by bending the sheets 91 and the legs of the V-member 93 upwards. This may in some cases be an alternative to the step of FIGURE 3. The structure of FIG. 14 may be severed either in the manner illustrated in FIG. 4 or the manner illustrated in FIG. 11 to provide either a plurality of single gap heads, or a multiple head construction. A number of single gap head subassemblies may be formed such as the subassembly 99 indicated in FIG. 15 having pole strips 100 and 101 with confronting beveled edges 100a and 101a defining a non-magnetic gap 102 and secured to a generally V-shaped non-magnetic member 104. The legs 100b and 101b of the strips may be bent parallel while the gap portion is in a clamping fixture as previously. Thereafter as indicated in FIG. 16, the upper surface of the pole strips 100 and 101 may be rounded as indicated at 100c and 101c to provide a smooth rounded tape-contacting surface for the head assembly which may be assembled as indicated in FIG. 9.

In FIGS. 17 and 18 is illustrated a still further modification of the method of the present invention wherein a pair of sheets of magnetic material 110 and 111 have edges secured in confronting relation to an end portion 112a of a third sheet 112 disposed therebetween. The members are secured to a pair of elongated generally V-shaped non-magnetic members 114 and 115, one on either side of the center sheet 112, as by spot welding as in the previous embodiments, spot welds being indicated between the member 114 and the sheet 110 at 117, between the member 114 and the sheet 112 at 118, between the sheet 112 and the member 115 at 119, and between the member 115 and the sheet 111 at 120, to closely space elongated gaps 122 and 123 thus defined by the structure. The heads so formed may utilize the cross field principle disclosed in my copending application Serial No. 248,360, or the gaps may be more widely spaced for conventional operation of the resulting heads. It will be understood that the sheet 110 may have deposited thereon a gap material of thickness to define an erase gap at 122, while the sheet 111 may have gap material deposited thereon of thickness to define a record-playback gap at 123. Alternatively the sheet 112 may carry the gap spacer material on its respective gap defining faces. The sheets 110 and 111 may have their flat end faces tapered as indicated at 127 if desired.

The structure of FIG. 17 may be severed to provide a plurality of separate heads in the manner illustrated in FIG. 18, with each pole piece structure comprising a pair of outer pole strips 130 and 131 having end edges disposed in confronting relation with an end portion 132a of a common leg 132 to define an erase gap 134 and a record-playback gap 135, the outer poles being secured with the common center leg 132 by means of V-shaped non-magnetic strips 137 and 138 welded as indicated in FIGS. 17 and 18. To complete the magnetic circuits for an assembled head, a pair of U-shaped yoke core pieces 140 and 141 may be provided for cooperation with the legs 130a and 131a bent as in the previous embodiment in conjunction with the common center leg 132, with an erase winding 145 on the outer leg 130 and a record-playback winding 146 on the outer leg 131.

It will be understood that the suitable mechanical operations and annealing are performed on the pole piece structure prior to assembly as in the previous embodiments.

Alternatively as indicated in FIG. 19, the structure of FIG. 17 may be divided into pole piece assemblies wherein the sheets 110 and 111 provide strips 151 and 152 which extend generally at right angles to the common leg 153 provided by the strip 112, the strips being secured together by means of V-shaped non-magnetic members 154 and 155 as in the previous embodiments. The magnetic circuits are completed by generally L-shaped members 158 and 159 having windings 160 and 161 thereon and suitably secured to the outer ends of the strips 151 and 152 and the lower end of the leg 153. The outer extremities of the strips 151 and 152 may be turned down as indicated at 151a and 152a to provide a more convenient tape receiving surface if desired and to give a smoother frequency response characteristic. This head construction resembles that shown in my copending application Serial No. 249,348, now Patent No. 2,785,232, of which the present application is a continuation-in-part.

FIG. 20 illustrates a head which is made by a method representing a modification of the method illustrated in FIG. 17 in that each of the sheets 110 and 111 is secured in confronting relation to a separate upright sheet such as indicated at 112, the method otherwise being readily understood from the description in connection with FIG. 17. The resulting head construction comprises a pair of outer leg strips 170 and 171 each disposed in confronting relation to an end portion of a center leg, 172 for leg 170 and 173 for strip 171. The leg 170 has its pole portion secured with the leg 172 by means of a generally V-shaped non-magnetic member 175, while a generally V-shaped non-magnetic member 176 secures the leg 173 with the strip 171. U-shaped yoke members 177 and 178 complete the magnetic circuits for the pole subassemblies. The gap between the legs 170 and 172 indicated at 180 may be an erase gap while the gap between the legs 173 and 171 indicated at 181 may be a record-playback gap for a multiple gap head assembly, or the gaps may be utilized in entirely separate heads. In a multiple gap head assembly, the pole subassemblies may be mounted as separate structures and brought as close together or spaced as far apart as desired. It is usually desirable to fill the space between members 172 and 173 with laminations of magnetic material in multiple gap applications.

While I have described certain specific embodiments it will be apparent that many modifications and variations may be made without departing from the scope of the novel concepts and teachings of the present invention.

I claim as my invention:

1. The method of making a magnetic head which comprises polishing and finishing elongated straight edges of a pair of sheets of magnetic material, depositing on at least one of said edges a layer of non-magnetic material of predetermined thickness and of melting point to withstand an annealing temperature of said sheets of magnetic material, placing said sheets in overlapping relation to a flat surface of an elongated member of non-magnetic material with said edges of said sheets disposed in confronting relation and spaced the thickness of said layer of non-magnetic material therebetween, applying positive pressure to said sheets to press said edges toward each other, and into parallel relationship, while so applying positive pressure to said sheets spot welding said sheets to said elongated non-magnetic member at predetermined longitudinally spaced intervals, making a series of transverse cuts on the welded assembly along lines extending between spot welded regions to divide said assembly into a plurality of magnetically separate pole subassemblies each including a pair of confronting poles provided by a portion of each of the respective edges of said sheets with a non-magnetic gap therebetween provided by a portion of the layer deposited on said edges, forming said pole subassemblies into finished configuration, and annealing said pole subassemblies at the annealing temperature.

2. The method of making a magnetic head which comprises placing a pair of sheets of magnetic material having straight elongated edges in overlapping relation to an elongated member of non-magnetic material with said elongated edges disposed in spaced parallel confronting relation, spot welding said sheets to said elongated non-magnetic member at predetermined longitudinally spaced intervals while maintaining said sheets in said spaced parallel confronting relation, making a series of transverse cuts on said sheets along lines extending between spot welded regions to divide said sheets into a plurality of magnetically separate pole subassemblies each including a pair of pole strips provided by a portion of each of the respective sheets and defining a non-magnetic gap therebetween, performing all severe mechanical operations on the magnetic material of said subassemblies and performing at least one severe mechanical operation on said magnetic material which substantially affects the magnetic characteristics of said magnetic material prior to the annealing thereof, annealing said pole subassemblies, and assembling said pole subassemblies with cooperating core parts and windings to form a completed magnetic head.

3. The method of making a magnetic head which comprises securing non-magnetic material of predetermined melting point to an edge of a flat planar sheet of magnetic material, bringing said edge of said sheet into close proximity with an end portion of a second flat planar sheet of magnetic material with the sheets separated by said non-magnetic material, applying positive pressure to said sheets to urge said edge towards said end portion, while so applying positive pressure to said sheets welding said sheets to an elongated non-magnetic member with the member spanning between the sheets to secure said edge in rigid spaced relation to said end portion, completing all mechanical operations on the magnetic material of said sheets and performing at least one severe mechanical operation on said magnetic material which substantially affects the magnetic characteristics of said magnetic material to form the same into a plurality of pole subassemblies having magnetically isolated gaps and ready for final assembly without further mechanical operations, and thereafter annealing said subassemblies at a temperature below the melting point of said gap material.

4. The method of making a magnetic head which comprises placing a pair of flat sheets of magnetic material in overlapping relation to respective flat surface portions of a member of non-magnetic material with adjacent end portions of the sheets disposed in spaced parallel relation to define an elongated non-magnetic gap, while maintaining said end portions of said sheets in said spaced parallel relation securing said sheets to said non-magnetic member with the non-magnetic member spanning between said sheets by means of a metal to metal surface bond to secure said end portions in rigidly spaced relation, making a series of transverse cuts on the resulting assembly to divide said assembly into a plurality of magnetically separate pole subassemblies each including a pair of pole strips provided by a portion of each of the respective sheets and with a non-magnetic gap between said pole strips provided by a portion of the elongated gap between the spaced end portions of the sheets and with a portion of said non-magnetic member secured to said pole strips and spanning therebetween, securing a metal mounting bracket to said portion of said non-magnetic member by means of a metal to metal surface bond, thereafter annealing the pole sub-assembly, mounting said pole subassembly with cooperating core parts and windings to provide a completed head assembly, and suspending said head assembly in a housing by means of said mounting bracket.

5. The method of making a magnetic head which comprises placing a pair of sheets of magnetic material in overlapping relation to a member of non-magnetic material with adjacent end portions of the sheets disposed in spaced parallel relation to define an elongated non-magnetic gap, while positively pressing said end portions of said sheets toward each other securing said sheets to said non-magnetic member with the non-magnetic member spanning between said sheets by means of a metal to metal surface bond to secure said end portions in rigidly spaced relation, making a series of transverse cuts on the resulting assembly to divide said assembly into a plurality of magnetically separate pole subassemblies each including a pair of pole strips provided by a portion of each of the respective sheets and with a non-magnetic gap between said pole strips provided by a portion of the elongated gap between the spaced end portions of the sheets and with a portion of said non-magnetic member secured to said pole strips and spanning therebetween, securing a tape support and guide bracket to said non-magnetic member portion by means of a metal to metal surface bond, bending said subassembly into final configuration, annealing said subassembly, and assembling said subassembly with cooperating core parts and windings to provide a completed magnetic head.

6. The method of making a magnetic head which comprises placing a pair of sheets of magnetic material in overlapping relation to a member of non-magnetic material with adjacent end portions of the sheets disposed in spaced parallel relation to define an elongated non-magnetic gap, securing said sheets to said non-magnetic member with the non-magnetic member spanning between said sheets by means of a metal to metal surface bond to secure said end portions in rigidly spaced relation, making a series of transverse cuts on the resulting assembly to divide said assembly into a plurality of magnetically separate pole subassemblies each including a pair of pole strips provided by a portion of each of the respective sheets and with a non-magnetic gap between said pole strips provided by a portion of the elongated gap between the spaced end portions of the sheets and with a portion of said non-magnetic member secured to said pole strips and spanning therebetween, bending said pole strips to provide generally parallel legs extending past said non-magnetic member portion on opposite sides thereof, thereafter annealing said sub-assemblies, and assembling said subassemblies with cooperating core parts to define closed magnetic circuits therewith and with windings linking said magnetic circuits.

7. The method of making a pole subassembly for a magnetic head, the subassembly to be annealed at a given temperature, which comprises securing to an edge of a strip of magnetic material non-magnetic material with a melting point above said annealing temperature, placing said edge of said strip of magnetic material in spaced parallel relation to the end portion of a second strip of magnetic material with said non-magnetic material interposed therebetween, applying positive pressure to said strips to press said non-magnetic material against said end portion of said second strip, securing said strips to a non-magnetic member by means of a metal to metal surface bond with the member spanning between said strips and securing said edge and said end portion in fixedly spaced relation, bending said strips into final configuration, and thereafter annealing the resulting structure at said given temperature.

8. The method of making a magnetic head which comprises placing respective end portions of a pair of flat planar sheets of magnetic material in overlapping relation to respective flat planar surface portions of an elongated member of non-magnetic metallic material with end surfaces of the respective sheets disposed in confronting parallel relation and separated by a non-magnetic material of uniform thickness and of melting point to withstand an annealing temperature of said sheets of magnetic material, applying positive pressure to said sheets to press said end surfaces of the respective sheets toward each other into parallel relation, while said end surfaces of the respective sheets are being pressed toward each other into parallel relation securing said end portions of said sheets to said elongated nonmagnetic member by means of a metal to metal surface bond, cutting and removing portions of said sheets while maintaining said non-magnetic member substantially intact to provide a plurality of spaced pairs of pole strips each secured to said non-magnetic member and defining a non-magnetic gap therebetween and with said non-magnetic member rigidly determining the position of said pairs of pole strips relative to each other along said non-magnetic member, bending said pole strips into finished configuration, and thereafter annealing said pole strips while secured to said non-magnetic member at the annealing temperature.

9. The method of making a magnetic head which comprises placing respective end portions of a pair of flat planar sheets of magnetic material in overlapping relation to respective flat planar surface portions of an elongated member of non-magnetic metallic material with end surfaces of the respective sheets disposed in confronting parallel relation and separated by a non-magnetic material of uniform thickness and of melting point to withstand an annealing temperature of said sheets of magnetic material, applying positive pressure to said sheets to press said end surfaces of the respective sheets toward each other into parallel relation, while said end surfaces of the respective sheets are being pressed toward each other into parallel relation securing said end portions of said sheets to said elongated non-magnetic member by means of a metal to metal surface bond, making a series of transverse cuts on the assembly through said sheets and said elongated member to divide said assembly into a plurality of separate magnetic head assemblies each including a pair of confronting poles provided by respective portions of said end surfaces with a non-magnetic gap therebetween provided by a portion of said non-magnetic material, and thereafter annealing said magnetic head assemblies at the annealing temperature.

10. The method of making a magnetic head which comprises placing respective end portions of a pair of flat planar sheets of magnetic material in overlapping relation to respective angularly related surface portions of an elongated member of non-magnetic metallic material with the end portions having a corresponding angle therebetween but with end surfaces of the respective sheets disposed in confronting parallel relation and separated by a non-magnetic material of uniform thickness and of melting point to withstand an annealing temperature of said sheets of magnetic material, applying positive pressure to said sheets to press said end surfaces of the respective sheets toward each other into parallel relation, while said end surfaces of the respective sheets are being pressed toward each other into parallel relation securing said end portions of said sheets to the respective angularly related surface portions of said elongated member by means of metal to metal surface bonds, making a series of transverse cuts on the sheets along lines extending transversely to said elongated member to divide said sheets into a plurality of magnetically separate pole sub-assemblies each including a pair of pole strips provided by a portion of each of the respective sheets and defining a non-magnetic gap therebetween, performing at least one severe mechanical operation on said magnetic material which substantially effects the magnetic characteristics of said magnetic material prior to annealing thereof, annealing said pole-sub-assemblies, and assembling said pole sub-assemblies with cooperating core parts and windings to form a completed magnetic head.

11. The method of making a magnetic head which comprises securing a pair of sheets to a non-magnetic member by means of a metal to metal surface bond with portions of the sheets disposed in spaced parallel relation and the non-magnetic member spanning therebetween, making a series of transverse cuts through said sheets and said non-magnetic member to divide said sheets into a plurality of pairs of pole strips each including a pair of confronting poles secured to a portion of said non-magnetic member, bending said strips around said non-magnetic member to extend generally parallel from said member, thereafter annealing each of said pole assemblies, and assembling said pole assemblies with cooperating core parts to form a closed magnetic circuit with a winding linking said circuit.

12. The method of making a magnetic head which comprises polishing and finishing elongated straight edges of a pair of sheets of magnetic material, depositing on at least one of said edges a layer of non-magnetic material of predetermined uniform thickness and of melting point to withstand an annealing temperature of said sheets of magnetic material, placing said sheets in overlapping relation to an elongated member of non-magnetic material with said edges of said sheets disposed in confronting parallel relation and spaced the thickness of said layer of non-magnetic material therebetween, applying positive pressure to said sheets to press said edges toward each other into parallel relation, while said edges are being positively pressed toward each other welding said sheets to said elongated non-magnetic member at spaced points along said non-magnetic member, cutting and removing portions of said sheets between said points where said sheets are welded to said non-magnetic member while maintaining said non-magnetic member substantially intact to provide a plurality of spaced pairs of pole strips each secured to said non-magnetic member and defining a non-magnetic gap therebetween and with said non-magnetic member rigidly determining the position of said pairs of pole strips relative to each other along said non-magnetic member, bending said pole strips into finished configuration, and thereafter annealing said pole strips while secured to said non-magnetic member at the annealing temperature.

13. The method of making a magnetic head which comprises securing a pair of strips of flat planar magnetic material to a non-magnetic member with end portions of the strip disposed in closely spaced relation and the non-magnetic member spanning therebetween, bending the strips about said non-magnetic member to extend on opposite sides of the member in spaced parallel relation, thereafter annealing said structure, and assembling said core structure with cooperating core parts to define a closed magnetic circuit with a winding linking said circuit.

14. The method of making a magnetic head which comprises polishing and finishing elongated straight edges of a pair of sheets of magnetic material, depositing on at least one of said edges a layer of non-magnetic material of pre-determined uniform thickness and of melting point to withstand an annealing temperature of said sheets of magnetic material, placing said sheets in overlapping relation to a flat surface of an elongated member of non-magnetic material with said edges of said sheets disposed in confronting parallel relation and spaced the thickness of said layer of non-magnetic material therebetween, applying positive pressure to said sheets to press said edges toward each other into parallel relation while said edges are being positively pressed toward each other welding said sheets to said elongated non-magnetic member, making a series of transverse cuts on the welded assembly along lines to divide said assembly into a plurality of magnetically separate pole subassemblies each including a pair of confronting poles provided by a portion of each of the respective edges of said sheets with a non-magnetic gap therebetween provided by a portion of the layer deposited on said edges, bending the magnetic material of said pole sub-assemblies into finished configuration, and thereafter annealing said pole sub-assemblies at the annealing temperature.

15. The method of making a magnetic head which comprises polishing and finishing elongated straight edges of a pair of sheets of magnetic material, depositing on at least one of said edges a layer of non-magnetic material of predetermined thickness and of melting point to withstand an annealing temperature of said sheets of magnetic material, placing said sheets in overlapping relation to a flat surface of an elongated member of non-magnetic material with said edges of said sheets disposed in parallel confronting relation and spaced the thickness of said layer of non-magnetic material therebetween, applying positive pressure to said sheets to press said edges toward each other in parallel relation, while said edges are being positively pressed toward each other welding said sheets to said elongated non-magnetic member, making a series of transverse cuts on the welded assembly through said sheets and said elongated member to divide said assembly into a plurality of separate magnetic head assemblies each including a pair of confronting poles provided by a portion of each of the respective edges of said sheets with a non-magnetic gap therebetween provided by a portion of the layer of deposited material, and annealing said magnetic head assembly at the annealing temperature.

References Cited in the file of this patent

UNITED STATES PATENTS

| | | |
|---|---|---|
| 1,131,037 | Cary | Mar. 9, 1915 |
| 1,243,004 | Taylor | Oct. 16, 1917 |
| 2,334,584 | Rich | Nov. 16, 1943 |
| 2,456,767 | Camras | Dec. 21, 1948 |
| 2,612,681 | Camras | Oct. 7, 1952 |
| 2,613,430 | Sefton et al. | Oct. 14, 1952 |
| 2,706,752 | Dupy | Apr. 19, 1955 |
| 2,754,569 | Kornei | July 17, 1956 |
| 2,763,729 | Camras | Sept. 18, 1956 |

OTHER REFERENCES

Metal Handbook, Am. Soc. for Metals, 1939, page 569.